UNITED STATES PATENT OFFICE.

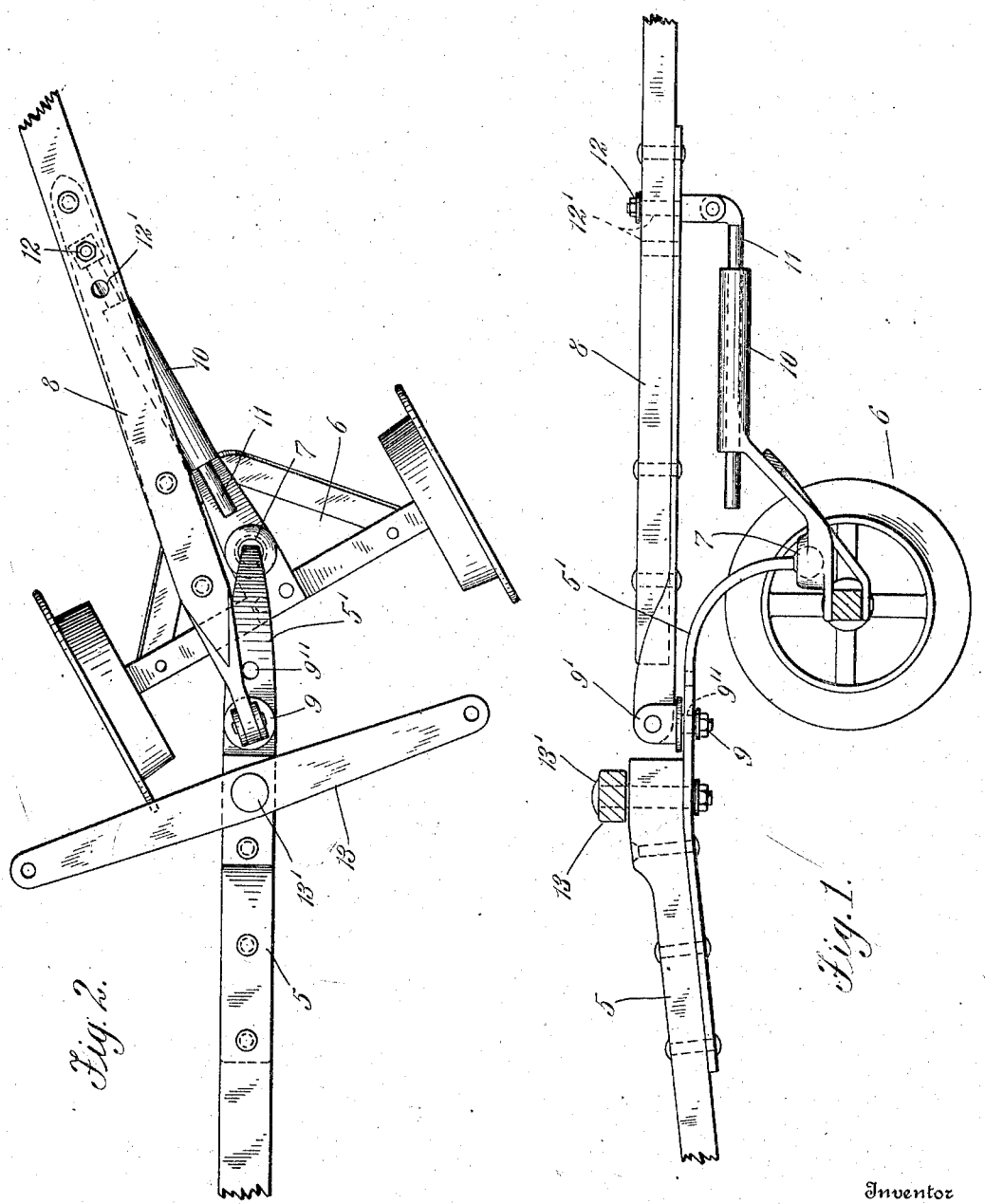

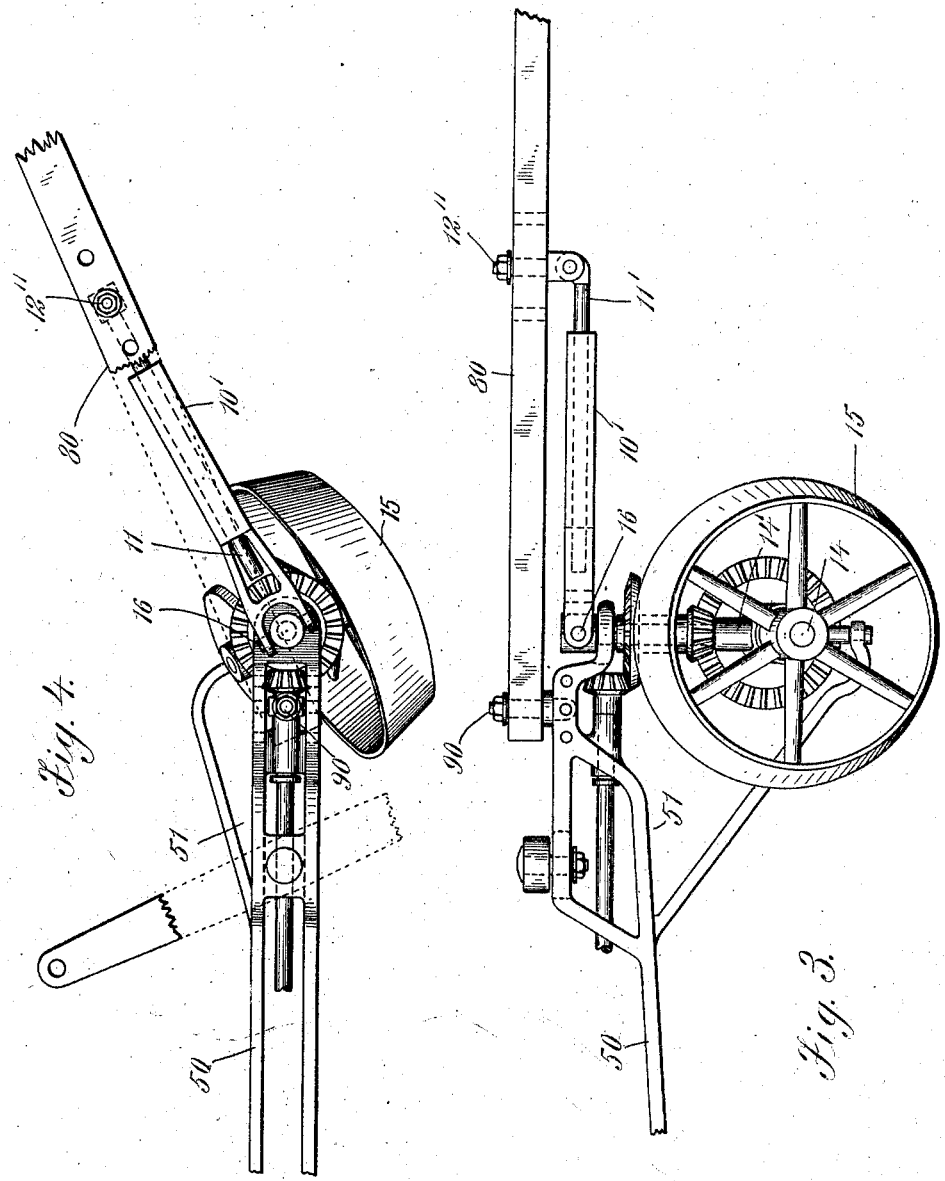

TRUED E. LIND, OF MOOSE JAW, SASKATCHEWAN, CANADA.

TRUCK-ADJUSTING MECHANISM.

967,647.  Specification of Letters Patent. Patented Aug. 16, 1910.

Application filed August 11, 1909. Serial No. 512,451.

*To all whom it may concern:*

Be it known that I, TRUED E. LIND, a citizen of the Dominion of Canada, and a resident of the city of Moose Jaw, in the Province of Saskatchewan, Dominion of Canada, have invented certain new and useful Improvements in Truck-Adjusting Mechanism, of which the following is a specification.

My invention relates to short turning mechanism for running gear, and has particular reference to leading traction machines, such as reapers, wherein the machine parts have lateral projection relatively to the line of lead and are liable to interfere with the adjacent horse in making short turns.

The invention has for its primary object to combine a leading truck with a tongue in an improved manner whereby, in turning or changing direction, the angular movement of the truck is increased over that of the tongue, and to this end the invention resides in certain novel features in the arrangement and combination of parts as hereinafter set forth and defined in the appended claims.

In the accompanying drawings, wherein like reference numerals indicate like parts throughout: Figure 1 is a sectional elevation of a truck combined with a tongue and reach in accordance with my invention. Fig. 2 is a plan with the tongue adjusted to an angular position as in turning. Fig. 3 is a side elevation of a modified embodiment, and Fig. 4 is a plan of the same with the tongue adjusted as in Fig. 2.

With reference to Figs. 1 and 2, numeral 5 designates a reach or forward extension of the machine or vehicle, and 6 indicates a leading truck pivotally connected with the reach by means of a ball and socket joint 7 combined with a curved extension 5' of the reach and with the truck axle as clearly shown.

In arranging the tongue, as 8, I pivot the same rearwardly of the truck, as at 9, for lateral movement, and connect the truck forwardly of its pivot with the tongue for angular adjustment. The provision for connecting the truck with the tongue, as shown, comprises a socket 10 secured to the truck axle, and a rod 11 slidably mounted in said socket and pivotally connected with a swivel bolt 12 seated on the tongue, while the pivot 9 comprises a swivel bolt seated on the reach extension 5' and connected with the tongue by means of a horizontal pivot 9'. As it may be desired to vary the relative degree of adjustment which will be imparted to the truck by swinging movement of the tongue, I provide the reach and tongue with a plurality of seats or apertures as 9" and 12" for the bolts 9 and 12 respectively, whereby the said bolts may be adjusted from the positions shown to decrease the leverage of the tongue and thereby increase the relative movement of the truck. The evener, as 13, is preferably connected directly with the reach as at 13', and the horses yoked to the tongue and hitched to suitable trees connected with the evener in the usual manner.

When desired to make a turn, the horses are first directed to swing the tongue on its pivot in the desired direction and thereby effect angular adjustment of the truck as indicated in Fig. 2. This adjustment may be continued to swing the truck substantially 90 degrees or more, as may be desired in making a short turn. The horses are then started in the direction of lead of the tongue and brought around in the usual manner to complete the turn without danger of interference with the machine.

In Figs. 3 and 4 I have shown my present invention applied in conjunction with a traction drive of the same form as that disclosed in my former Patent No. 899,878, wherein the beveled traction wheel 15 is secured to a shaft 14 journaled on a standard 14' supported for angular adjustment on a bracket 51 of a frame extension 50. In this connection the tongue 80 is engaged with a swivel bolt 90 mounted on said bracket, while the socket 10' is engaged with laterally projecting pins 16 secured to standard 14', and the slide rod 11' connected with a swivel bolt 12" seated on the tongue.

Having thus described my invention, what I claim as new, and desire to secure by Letters Patent of the United States of America, is:

1. A running gear having a truck mounted for angular adjustment, a tongue fulcrumed rearwardly of the truck for lateral movement, and a forwardly disposed give and take connection between said tongue and truck for adjusting the latter.

2. A running gear having a pivoted truck, a tongue pivoted rearwardly of said truck, and a connection between said truck and said tongue for effecting a relatively greater angular adjustment of said truck by and during angular adjustment of said tongue, said connection comprising a socket member and a rod slidably supported therein, one of which is connected to said tongue and the other to said truck.

3. A running gear having a pivoted truck, a tongue pivoted to said running gear rearwardly of the point of pivot of said truck, a give and take connection connected with said truck and extending forwardly thereof, said connection comprising telescoping members, and a swivel connection between said tongue and said give and take connection.

Signed at Seattle, Washington this 4 day of August 1909.

TRUED E. LIND.

Witnesses:
FRANK E. ADAMS,
STEPHEN A. BROOKS.